June 28, 1955    A. R. CUNNINGHAM    2,711,622
ROTARY CROP TREATING DEVICE
Filed March 30, 1953    2 Sheets-Sheet 1

INVENTOR.
A. R. CUNNINGHAM
ATTORNEYS

INVENTOR.
A. R. CUNNINGHAM

ATTORNEYS

United States Patent Office 2,711,622
Patented June 28, 1955

2,711,622

ROTARY CROP TREATING DEVICE

Arthur Raymond Cunningham, Utica, Minn.

Application March 30, 1953, Serial No. 345,446

7 Claims. (Cl. 55—118)

This invention relates to a machine and apparatus for treating crops and more particularly to such machine or apparatus for mechanically accelerating the release of moisture from hay and similar crops.

The harvesting of hay or similar crops is customarily carried out by mowing the hay and leaving it lying in swaths on the field to dry or cure. Subsequently, by means of a side-delivery rake or similar machine, the hay is formed into windrows. The windrowing step not only turns the hay over so that under portions thereof are exposed to the air and the sun but the swaths are considerably narrowed so that they may be more readily picked up by machines such as balers, hay choppers, hay loaders, etc.

It has been found over the years that the stems of hay, alfalfa, etc. contain considerably more moisture than the leaves, whereas the leaves contain by far the greater proportion of food value. The greater proportion of moisture in the stems obviously requires prolonged curing, but it follows that such prolonged curing results in overcuring of the leaves, whereupon the leaves become dry and brittle and become detached from the stems during subsequent handling of the crops, thus materially lessening the nutrient content of the crops.

Processes and machines for attempting to eliminate or at least alleviate some of the foregoing problems have heretofore been more numerous than satisfactory, operating primarily upon either one or the other of the following principles: Artificial heat or mechanical means for accelerating release of moisture from the stems. Regardless of the advantages or disadvantages of the method using artificial heat, the mechanical system seems preferable, because it is readily portable, may be constructed in the form of a machine that is well within the economic reach of the ordinary farmer and gives results that, on the basis of comparative tests at least, are markedly superior to results obtained by artificial heat. Typical of the hitherto most popular machine for mechanically accelerating the release of moisture from hay, alfalfa, etc. is that comprising a mobile frame adapted to be drawn behind a tractor or the like and including a pair of cooperating smooth rolls between which the harvested crops are passed, being subjected to a squeezing action that splits the stems so that interior portions of the stems are exposed to the sun and the air. It has been found, however, that the leaves are simultaneously squeezed and bruised and the release of moisture therefrom is also accelerated, so that the user is substantially back where he started from. Other machines use corrugated rolls with closely meshing teeth that subject both the stems and the leaves to the same squeezing and bruising action as the smooth rolls. In machines of either of the mechanical types just mentioned, the mobile frame carries the rolls at a considerable height above the ground so that additional means must be provided to elevate the crops to the rolls, and such machine is in over-all design relatively complicated and expensive.

According to the present invention, all of the foregoing problems are eliminated and a simple and inexpensive design is provided by the utilization of specially constructed rolls that serve not only to treat the crops in an improved manner but to pick up the crops from the ground, thus eliminating the need for additional pickup means. Improved treatment of the crops in substitution for the crushing or squeezing action heretofore known is accomplished by the provision of a pair of loosely meshing toothed or fluted rolls, each tooth on each roll being in the form of a blade-like element having a comparatively small circumferential dimension, especially when compared with the circumferential dimension between a pair of neighboring teeth on the other roll, whereby the teeth loosely intermesh so as to have considerable interplay, the spacing between the teeth forming pockets that readily accommodate the leaves so that the leaves are subjected to little or no crushing or squeezing action and deformation of the stems is accomplished solely by the edges of the teeth. Such deformation of the stems is principally in the form of cracking of the stems transverse to their lengths at longitudinally spaced points generally on the order of the circumferential spacing of the teeth on the rolls. Accordingly, the stems are not broken up or crushed into small pieces, nor are extending fibers left to become hard and stiff after drying. Thus, the crops treated by the rolls of the present machine are not only more nutritious from the standpoint of retention of the food value in the leaves caused by avoidance of crushing of the leaves, but the stems are so treated as to be rendered more palatable to the animals consuming the crops.

That feature of the inventiton residing in the utilization of the same rolls without the need for an additional pickup means is accomplished by relating the rolls and the peripheral speed thereof to the swath over which the machine travels so that the meshing rolls form a downwardly opening bite into which the teeth sweep and lift the crops as the machine passes over them. The leading or front roll is considerably larger than the rear or trailing roll and the relative diameters of the rolls and the relative levels of their axes are such that the lowermost teeth of the rolls lie substantially in the same generally horizontal plane, and the lowermost teeth on the front roll travel downwardly and rearwardly and then upwardly and the lowermost teeth on the rear roll travel forwardly and upwardly into the bite. Because of the relatively smaller diameter of the rear roll, the crops are discharged rearwardly over the top of the rear roll and back onto the stubble. The frame is carried by ground-engaging means such as wheels at a fixed level above the ground, preferably in such manner that the teeth of the rolls engage only the layer of stubble-supported plant toppings without engaging and pulling out any of the standing stubble. A further feature of the invention resides in the provision of means whereby the fixed height or level of the frame may be adjusted relative to the stubble, consequently providing means for adjusting the relationship between the rolls and the stubble-supported crops. A still further feature of the invention lies in the provision of end shields for the rolls, which shields are relatively narrow as compared to the axial lengths of the rolls and which shields extend downwardly ahead of the front roll and then rearwardly under both rolls, the purpose of the shields being to enclose the ends of the rolls and to prevent wrapping of the crops about the bearings and supports that carry the rolls on the frame.

The foregoing and other important objects and desirable features inherent in and encompassed by the invention will become apparent as a preferred embodiment of the invention is fully disclosed in the following detailed description and accompanying sheets of drawings in which Fig. 1 is a perspective view of the machine.

Figure 1:
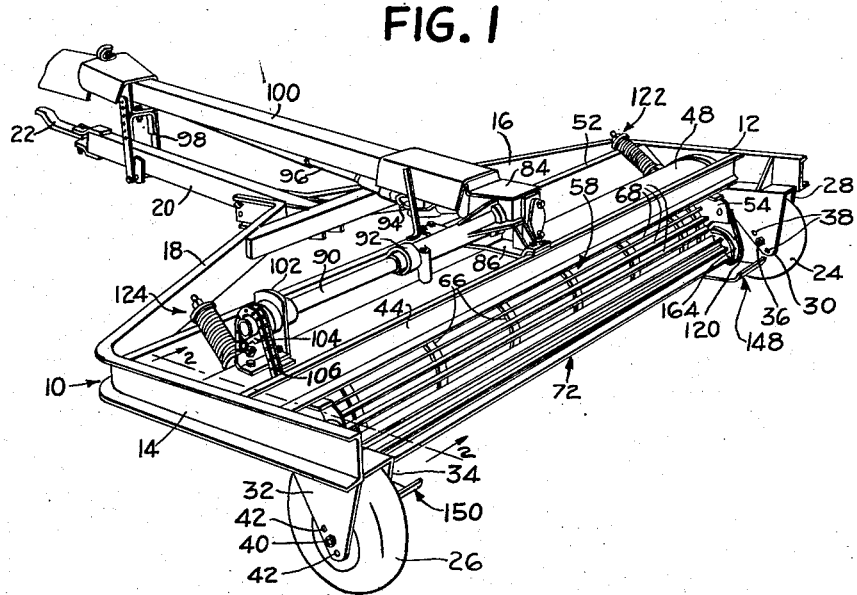
Figure 2:
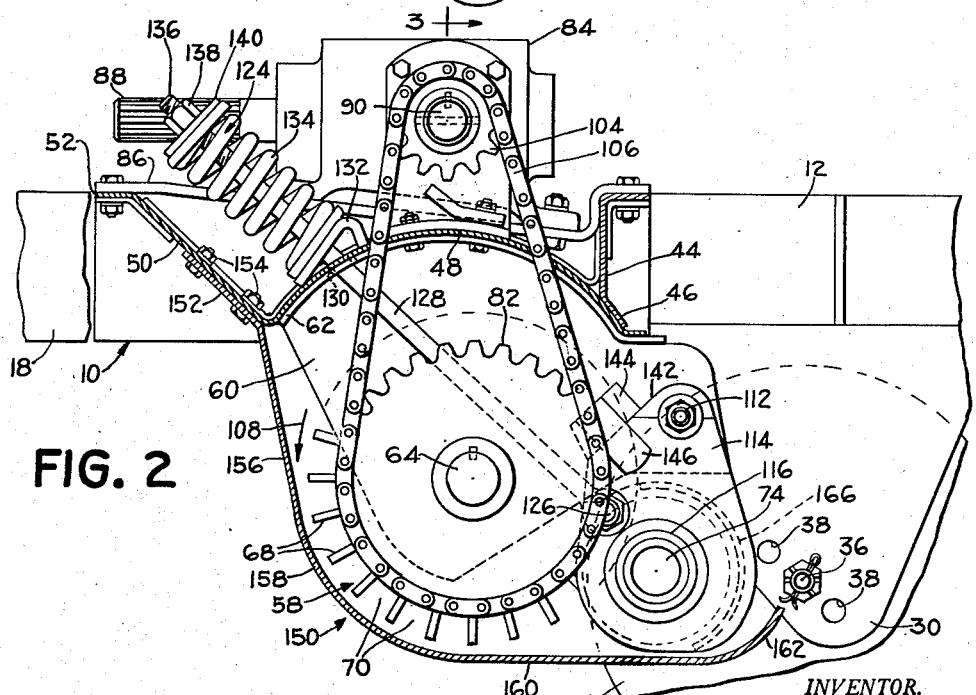
Fig. 2 is a fragmentary sectional view, on an enlarged scale, as seen substantially along the line 2—2 of Fig. 1.

The machine chosen for the purposes of illustration here comprises a main frame 10 having right- and left-hand side bars or members 12 and 14 that converge forwardly at 16 and 18 to form a connection with a longitudinally extending draft tongue 20 by means of which the machine may be towed by a tractor or similar vehicle, the drawbar of which may be taken to be represented in Fig. 1 by the numeral 22. The rear end of the frame 10 is supported by ground-engaging means in the form of right- and left-hand wheels 24 and 26, the wheels being supported respectively at the rear ends of the frame side bars 12 and 14 by spaced supporting plates 28 and 30 and 32 and 34. The wheel 24 is carried between the plates 28 and 30 on a short axle or spindle 36, and the plates 28 and 30 are provided with a plurality of sets of transversely alined apertures for selectively receiving the axle 36, thus providing means for vertical adjustment of the frame relative to the wheel 24. The apertures in the plate 30 are visible at 38 in Figs. 1, 2 and 4.

Supporting of the left-hand wheel 26 is accomplished in a not unlike manner, the wheel 26 having a transverse axle or spindle 40 adjustably arranged relative to the supports 32 and 34 by apertures like those just described. Apertures in the plate 32 are visible at 42 in Fig. 1.

Rear end portions of the side bars 12 and 14 are rigidly cross-connected by a transverse supporting bar 44 that has a rearwardly and downwardly directed flange 46 to which is rigidly secured, as by welding, the rear portion of a second and larger transverse member 48 of arcuate section. The member 48 is arcuate about an axis ahead of the common axis of the wheels 24 and 26 and has its forward end directed upwardly and forwardly at 50 and flanged at 52 to create a box section by means of which forward portions of the frame side bars 12 and 14 are rigidly cross-connected. The object of the frame structure is to provide a frame that is sufficiently rigid to withstand the loads imposed thereon during operation but sufficiently lightweight to achieve the characteristics of simplicity and economy, both in manufacture and in design.

Figure 3:
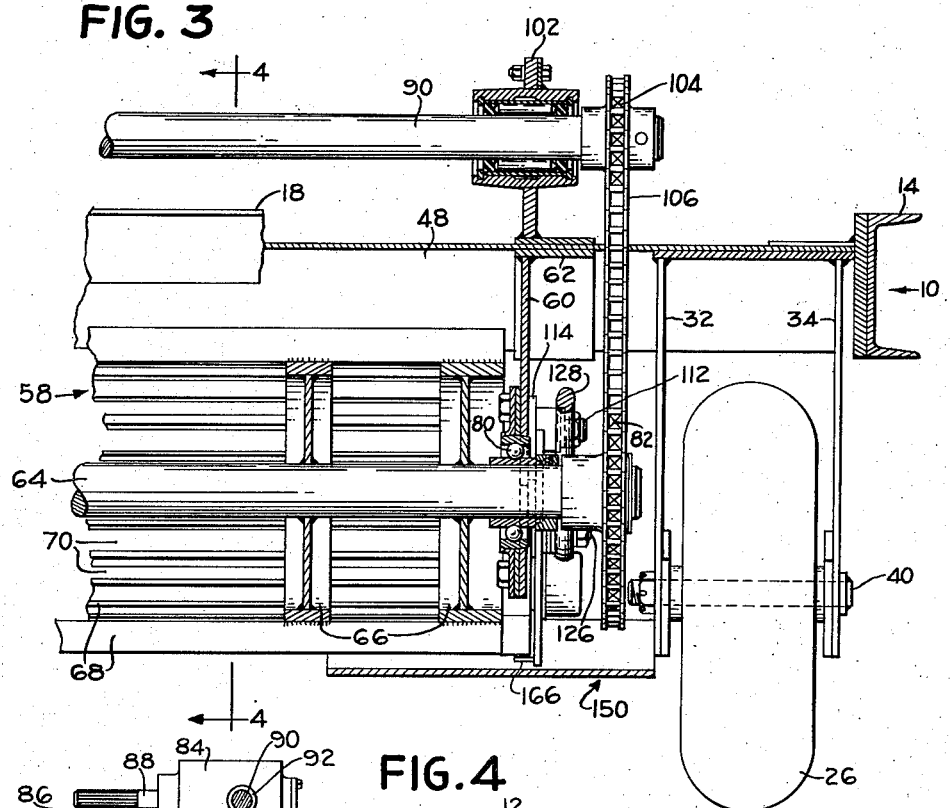
Fig. 3 is a transverse sectional view as seen substantially along the line 3—3 of Fig. 2, certain parts being shown in elevation for the purposes of convenience.
Figure 4:
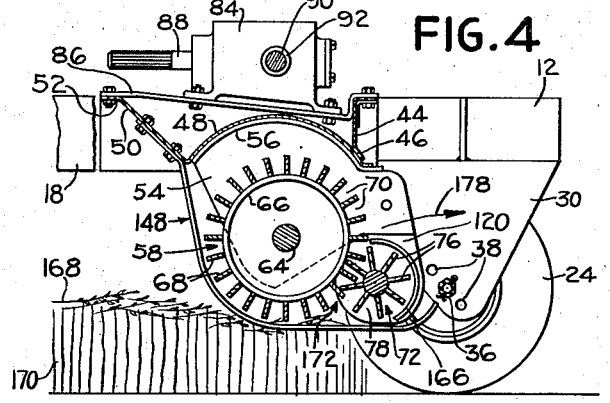
Fig. 4 is a fragmentary sectional view, on a scale reduced below that of Fig. 3, as seen along the line 4—4 of Fig. 3.

The frame 10 carries at its right-hand end, via the members 48 and 44, a depending support in the form of a plate 54 of a shape best shown in Figs. 1 and 4. This plate has an arcuate flange 56 which nests with the proximate end portion of the arcuate transverse member 48 and the components are rigidly secured, as by welding, to afford ample support for one end of a leading or front crop-treating roll 58, the other end of which is supported in a plate 60 very similar to the plate 52 just described (Fig. 3). The plate 60 has an arcuate flange 62 rigidly secured, as by welding, to the proximate end portion of the arcuate transverse member 48. The two plates 52 and 60 may be considered substantially identical, except that there are certain characteristics that distinguish not the plates but the function of the plate 60 from the plate 52. These functional characteristics will be described below.

The front crop-treating roll 58 comprises a relatively long shaft 64 having rigidly secured thereto at axially spaced intervals a plurality of spiders or tooth-supporting members 66. The spiders 66 serve to support a plurality of circumferentially spaced teeth 68 that run lengthwise of the roll 58. The teeth 68 are thus supported in uniform circumferentially spaced relation about the roll but only at the points at which they contact the spiders 66, being thus free of interconnection at portions thereof between the spiders. Since there are relatively few spiders as compared with the over-all length of the roll, the major portions of the teeth are unsupported, and the plurality of uniformly circumferentially spaced pockets 70, that are formed between the neighboring teeth 68, are bottomless, except in the zones in which the teeth 68 engage and are supported by the spiders 66. In short, the roll 58 has a "squirrel cage" construction. The bottomless nature of the pockets 70 between the teeth 68 may be best seen in Fig. 4. Further characteristics of the roll 58 will be described in connection with the description of a trailing or rear roll 72.

This roll, as will be readily observed, is considerably smaller than the front roll, being here shown as substantially one-half the diameter of the front roll; although, variations between one-half to one-eighth the size of the front roll have been and can be used with different degrees of success. The rear roll 72 may be of "solid" construction, as distinguished from the "squirrel cage" construction of the front roll; although, "squirrel cage" design may be utilized for the rear roll if desired. The rear roll comprises essentially a shaft 74 substantially equal in length to the shaft 64 and a plurality of radially outwardly projecting teeth 76. These teeth, like the teeth 68 on the front roll 58, are extremely long and relatively narrow blade-like elements uniformly circumferentially spaced about the axis of the shaft 74, the circumferential spacing of the teeth being the same as that of the teeth 68 on the roll 58 so that the teeth 76 and 68 intermesh. The space between neighboring teeth 76 forms a pocket 78 of a size and shape similar but not necessarily identical to those of any of the pockets 70 formed between the teeth 68 on the front roll 58. The circumferential dimension or thickness of each tooth 68 and 76 is extremely small compared with the circumferential spacing between neighboring teeth. Thus, the pockets 70 and 78 are relatively large and the mesh is extremely loose, for purposes to presently appear.

The shaft 64 of the front roll 58 is journaled on the frame by means of appropriate supports at each of its opposite ends. Fig. 3 shows a typical support for the left-hand end of the shaft 64. From this figure, it will be seen that the supporting plate 60 is centrally apertured to receive an anti-friction bearing 80. A similar bearing (not visible in the drawings) is provided in the right-hand supporting plate 54 for journaling the right-hand end of the shaft 64. Also, as best shown in Fig. 3, the left-hand end of the shaft 64 projects outwardly beyond the bearing 80 and has keyed thereto a driven sprocket 82.

The central portion of the frame 10 supports a gear housing 84 by means of a fore-and-aft extending support 86 that is secured at opposite ends respectively to the rear transverse member 44 and to the flange 52 of the arcuate transverse member 48. The housing 84 may contain appropriate gearing (not shown) for drivingly interconnecting a forwardly extending shaft 88 and a transversely extending shaft 90. Since the shaft 90 is relatively long, the housing may include a lateral sleeve extension 92 for supporting the shaft. The shaft 88 is connected by a suitable universal joint 94 (Fig. 1) to a propeller shaft 96 that extends forwardly to a suitable support 98 adjacent to the forward end of the draft tongue 20. In the particular illustration in Fig. 1, the propeller shaft 96 is shielded at 100 in a conventional manner. The shielding thus covers a conventional connection to the power take-off shaft of the tractor (not shown) that tows the machine. These details are considered immaterial and have not been unnecessarily illustrated.

Figure 6:
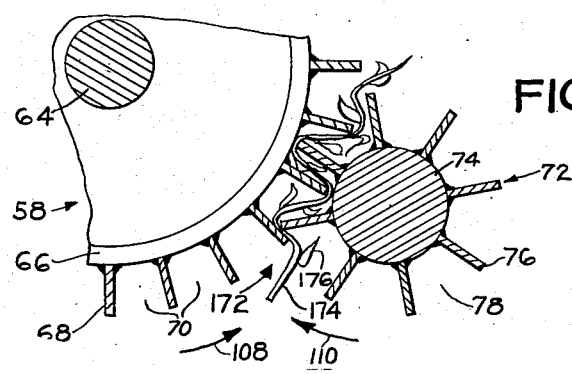
Fig. 6 is a fragmentary sectional view, on the scale of Figs. 2 and 3, showing the relationship between the rolls and the manner in which the crops are passed therethrough to be treated.

The shaft 90 extends toward the left-hand end of the machine and is there supported by an appropriate bearing 102 and extends beyond that bearing and has keyed thereto a driving sprocket 104. A driving chain 106 is trained about the sprocket 104 and about the sprocket 82 for the front roll 58. The difference in diameters of the sprockets 82 and 104 is calculated to produce a peripheral speed of the roll 58 substantially twice the rate of advance of the machine (e. g., a roll speed of 8.6 M. P. H.). The direction of rotation of the roll 58 is indicated by the arrow 108. Because of the intermesh between the rolls, the rear roll 72 will rotate in the direction of the arrow 110 (Fig. 6). The intermesh between the teeth of the rolls constitutes the sole means by which the rear roll 72 is driven by the front roll 58.

Figure 5:
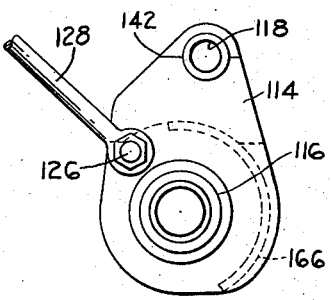
Fig. 5 is a detail view, on the scale of Figs. 2 and 3, showing the mounting means for one end of the rear roll.

The left-hand roll-supporting plate 60 is provided rearwardly of the axis of the roll 58 with a short transverse pivot 112 on which is mounted a rear-roll-supporting plate 114, which plate has an anti-friction bearing 116 in which is journaled the left-hand end of the rear roll shaft 74. A detail view of this plate appears in Fig. 5, wherein it will be seen that the upper portion of the plate is apertured at 118 to receive the pivot 112. A similar plate, shown at 120 in Figs. 1 and 4, is provided for supporting the right-hand end of the rear roll shaft 74.

The roll 72 is biased or spring-loaded toward the front roll 58 by right- and left-hand biasing means designated respectively by the numerals 122 and 124. Since the left-hand means 124 is shown in greater detail, it will be further described, it being understood that the right-hand means 122 is of a similar nature. The rear-roll-supporting plate 114 at the left-hand side of the machine is pivotally connected at 126 to an upwardly and forwardly extending rod 128. This rod passes through an aperture 130 in the arcuate transverse member 48 and through an apertured bracket 132, extending thence through a coiled compression spring 134 and having a threaded upper end 136 to receive a nut 138 for confining the spring 134 between the bracket 132 and a washer 140. In order that movement of the rear roll 72 toward the front roll 58 may be limited to a desired extent, the plate 114 has an upper forward portion 142 serving as one of a pair of stops, the other stop comprising an abutment lug 144 welded to the front-roll-supporting plate 60 just ahead of the pivot 112. This lug includes a rearwardly and downwardly extending tongue 146 projecting alongside a forward portion of the plate 114 and serving as a guide for the plate.

A further feature of the invention resides in right- and left-hand shield means 148 and 150 respectively for right- and left-hand ends of the rolls 58 and 72. As best shown in Fig. 3, the left-hand shield means 150 comprises an upper forward portion 152 that is secured by a pair of cap screws and nuts 154 to the forward inclined portion 50 of the arcuate transverse member 48. The shield then extends downwardly at 156 ahead of the front roll 58, curving at 158 generally about the proximate end portion of the roll on an arc having as its center the axis of the roll. The shield then extends rearwardly at 160 beneath the proximate end portions of both rolls 58 and 72, curving upwardly at its rear end at 162 in the nature of a skid. Since the right-hand shield may be identical, it is considered unnecessary to describe it in detail. The purpose of the shields is to enclose from below the proximate end portions of the rolls 58 and 72. It will be observed that each shield is extremely narrow compared to the length of the rolls. Hence, the shielding effect is confined solely to the ends of the rolls and the shields serve to prevent crops from winding about exposed portions of shafts, bearings, etc. One difference between the right- and left-hand shield means 148 and 150 is that the latter may be somewhat wider, because it must also enclose the forward and lower portions of the sprocket 82, there being no sprocket and drive means at the right-hand side of the machine. Because of the relatively small diameter of the rear roll, it is shielded at its proximate end portions by extremely narrow arcuate shields 164 and 166. Each of these shields embraces the rearward and upper end portions of the rear roll 72 and, like the shields 148 and 150, prevents wrapping of crops about the roll 58.

After the field has been mowed in a conventional manner, the plant toppings, consisting of the upper portions of stems and attached leaves of the hay, alfalfa, etc., will lie in swaths in the form of a layer 168 supported by the stubble 170 from which the toppings are cut (Fig. 4). As the frame and its associated components are advanced over the field, the lowermost teeth of the front and rear rolls 58 and 72 will penetrate the layer 168 and, the rolls rotating in the directions of the arrows 108 and 110, will sweep and lift the engaged crops upwardly into the bite 172 formed by the meshing rolls (Fig. 6). No additional pick-up means is required, since the teeth and the rolls function to pick up the crops, as well as to deform the crops in a manner to be presently described.

Fig. 6 is a schematic illustration of the passage of a stem 174 and attached leaves 176 through the rolls. Initially, the stem will be picked up by the teeth 68 and 76 and will bridge across neighboring teeth on one roll and then will be engaged by a meshing tooth on the other roll to assume generally the relationship shown in the drawing. The stem is thus deformed between the teeth. In particular, the initial engagement between the teeth is such that a tooth on one roll will initially interfit between neighboring teeth on the other roll and will engage one of the neighboring teeth at the side, contacting said neighboring tooth along its own outer edge. Because of the loose intermesh of the rolls and also because of the difference between the ratio of the number of teeth on one roll to the number of teeth on the other roll and the ratio of the diameter of one roll to the diameter of the other, the engaging tooth on one roll will slide along the face of the other tooth and the stem, bridging across the neighboring teeth, will be somewhat stretched into the pocket 70 or 78, primarily because the loose intermesh of the teeth results in instantaneous acceleration of the peripheral speed of the roll 72 over that of the roll 58, since, as stated above, the meshing of the teeth constitutes the sole driving means between the rolls. As the instantaneous acceleration at intervals occurs, stretching of the stem 174 results, in addition to which the stem is bent about the outermost edges of the teeth as illustrated. Another advantage of the loose intermesh is that the leaves 176 are accommodated by the pockets 70 and 78, as shown, and any crushing action or similar deformation is confined largely to the stems, which is desirable because the higher moisture content occurs in the stems and the result is that the stems are conditioned to release moisture substantially on a par with the release of moisture from the leaves.

Because of the small diameter of the roll 72, the deformed crops are discharged rearwardly in the direction of the arrow 178 (Fig. 4) and again fall upon the stubble 170, where the crops are left to cure. After treatment of the crops by the rolls 58 and 72 the crops require only a relatively short curing time while stubble-supported and it is feasible to pick up the crops the next day, or even late in the same day in some instances.

Because of the "squirrel cage" construction of the roll 58, the pockets 70 are bottomless, as previously explained. Accordingly, crops cannot pack between the teeth 68. Therefore, the pockets 70 do not accumulate crops to such extent as to substantially nullify the effectiveness of the teeth, as would be the case in the ordinary corrugated roll. Whatever crops find their way into the interior of the roll 58 through the bottomless pockets 70 ultimately escape because of centrifugal force. As a matter of fact, accumulation of crops within the roll 58 is negligible, since the stems of the crops are relatively tough and the particular treatment afforded the crops here is not such as to chop the crops. Thus, the stems will retain their length and will be discharged rearwardly without excessive packing and wrapping.

It will be observed that the ground wheels 24 and 26 are located rearwardly and somewhat outwardly of the ends of the rolls. Accordingly, these wheels are not riding on a particular portion of the swath being picked up, which also serves to eliminate wrapping, particularly at the ends of the rolls. As explained above, the vertical relationship between the frame 10 and the wheels 24 and 26 may be adjusted by the means 36—38 and 40—42. The machine is readily connectible to any conventional draft vehicle having a power take-off shaft. If desired, the rolls could derive power directly from a ground wheel by using appropriate speed-proportioning means.

Other advantages and features of the invention not specifically enumerated herein will undoubtedly occur to those versed in the art, as will many modifications and alterations in the preferred embodiment of the invention disclosed, all of which may be achieved without departing from the spirit and scope of the invention.

What is claimed is:

1. Crop-treating apparatus of the character described, comprising: a supporting frame; ground-engaging wheels carrying the frame for advance over a field on which previously harvested plant toppings including stems and attached leaves form a layer supported on their own stubble and lie with the stems predominantly horizontally and generally parallel to the line of advance, said wheels serving to fix the height of the frame above said layer of toppings; a front, crop-treating roll and a rear crop-treating roll journaled on the frame respectively on horizontal parallel axes transverse to the line of advance and having loosely meshing teeth defining a downwardly opening toppings-receiving bite; the front roll being materially larger in diameter than the rear roll, and the axes of the rolls being at such respective levels that the lowermost teeth of the rolls are substantially coplanar in a horizontal plane below the top of the layer of toppings; the rolls being rotatable so that the lowermost teeth of the front roll move rearwardly and upwardly and the lowermost teeth of the rear roll move forwardly and upwardly to sweep plant toppings into said bite to be deformed by the meshing teeth, and the uppermost teeth of the rear roll traveling rearwardly to discharge the deformed toppings rearwardly; each tooth on each roll comprising a blade-like element projecting radially from and running lengthwise of its roll and of substantially uniform circumferential thickness throughout both its length and its radial dimension and said teeth on each roll being uniformly circumferentially spaced to provide between each pair of neighboring teeth on each roll a toppings-receiving pocket having a circumferential dimension several times that of a tooth in order to accommodate not only the meshing tooth of the other roll but also leaves on the toppings while the stems of such toppings are engaged by the outer edges of the meshing teeth; and the intermeshing teeth of the rolls serving as the sole means for driving one roll from the other.

2. The invention defined in claim 1, in which: one of the rolls comprises a plurality of axially spaced spiders having peripheral tooth-supporting portions; and the teeth of said roll are individual elements fixed to said tooth-supporting portions, being supported solely by the spiders between the spiders so that the pockets formed between said teeth are bottomless through a major portion of the length thereof.

3. The invention defined in claim 1, in which: the relative diameters of the rolls and the horizontal levels of the roll axes are such that the uppermost part of the cylinder generated by rotation of the rear roll is below the axis of the front roll.

4. The invention defined in claim 1, in which: means is provided for positively driving one roll at such speed that the peripheral speed of each roll equals substantially twice the rate of advance of the frame.

5. The invention defined in claim 1, in which: the frame carries a pair of shields, one at each of the ends of the rolls, each shield being comparatively narrow relative to the axial length of the rolls and extending downwardly ahead of the proximate end portion of the front roll, then rearwardly closely beneath the proximate end portions of both rolls.

6. Crop-treating apparatus of the character described, comprising: a supporting frame; ground-engaging wheels carrying the frame for advance over a field on which previously harvested plant toppings including stems and attached leaves form a layer supported on their own stubble and lie with the stems predominantly horizontally and generally parallel to the line of advance, said wheels serving to fix the height of the frame above said layer of toppings; a front, crop-treating roll and a rear crop-treating roll journaled on the frame respectively on horizontal parallel axes transverse to the line of advance and having loosely meshing teeth defining a downwardly opening toppings-receiving bite; the front roll being materially larger in diameter than the rear roll, and the axes of the rolls being at such respective levels that the lowermost teeth of the rolls project below the top of the layer of toppings and the uppermost teeth of the rear roll are below the level of the axis of the front roll; means for rotating the rolls respectively in opposite directions so that the lowermost teeth of the front roll move rearwardly and upwardly and the lowermost teeth of the rear roll move forwardly and upwardly to sweep plant toppings into said bite to be deformed by the meshing teeth, and the uppermost teeth of the rear roll travel rearwardly to discharge the deformed toppings predominantly rearwardly; and the teeth on each roll projecting radially from and running lengthwise of the respective roll and being uniformly circumferentially spaced to provide toppings-receiving pockets between neighboring teeth on each roll to accommodate the meshing teeth of the other roll and toppings engaged by the outer edges of the meshing teeth in the aforesaid bite.

7. Crop-treating apparatus of the character described, comprising: a supporting frame; ground-engaging wheels carrying the frame for advance over a field on which previously harvested plant toppings including stems and attached leaves form a layer supported on their own stubble and lie with the stems predominantly horizontally and generally parallel to the line of advance, said wheels serving to fix the height of the frame above said layer of toppings; a front, crop-treating roll and a rear crop-treating roll journaled respectively at their opposite ends on the frame respectively on horizontal parallel axes transverse to the line of advance and having loosely meshing teeth defining a downwardly opening toppings-receiving bite, the axes of the rolls being at such respective levels that the lowermost teeth of the rolls project below the top of the layer of toppings; means for rotating the rolls respectively in opposite directions so that the lowermost teeth of the front roll move rearwardly and upwardly and the lowermost teeth of the rear roll move forwardly and upwardly to sweep plant toppings into said bite to be deformed by the meshing teeth, and the uppermost teeth of the rear roll travel rearwardly to discharge the deformed toppings predominantly rearwardly; the teeth on each roll projecting radially from and running lengthwise of the respective roll and being uniformly circumferentially spaced to provide toppings-receiving pockets between neighboring teeth on each roll to accommodate the meshing teeth of the other roll and toppings engaged by the outer edges of the meshing teeth in the aforesaid bite; and a pair of shields carried by the frame, one at each end of at least one of the rolls, each shield being comparatively narrow relative to the length of said one roll and embracing the respective end of said one roll from the front and bottom to prevent wrapping of toppings on said roll end.

References Cited in the file of this patent

UNITED STATES PATENTS

| | | |
|---|---|---|
| 639,618 | Russell | Dec. 19, 1899 |
| 2,304,811 | Frederickson | Dec. 15, 1942 |
| 2,345,715 | Reed | Apr. 4, 1944 |
| 2,347,664 | Chilton | May 2, 1944 |